United States Patent
Wu et al.

(10) Patent No.: US 8,990,827 B2
(45) Date of Patent: Mar. 24, 2015

(54) OPTIMIZING DATA WAREHOUSING APPLICATIONS FOR GPUS USING DYNAMIC STREAM SCHEDULING AND DISPATCH OF FUSED AND SPLIT KERNELS

(71) Applicants: Haicheng Wu, Princeton, NJ (US);
Srihari Cadambi, Princeton, NJ (US);
Srimat T Chakradhar, Manalapan, NJ (US)

(72) Inventors: Haicheng Wu, Princeton, NJ (US);
Srihari Cadambi, Princeton, NJ (US);
Srimat T Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 301 days.

(21) Appl. No.: 13/646,662

(22) Filed: Oct. 6, 2012

(65) Prior Publication Data
US 2013/0091507 A1 Apr. 11, 2013

Related U.S. Application Data

(60) Provisional application No. 61/545,829, filed on Oct. 11, 2011, provisional application No. 61/586,309, filed on Jan. 13, 2012.

(51) Int. Cl.
*G06F 9/46* (2006.01)
*G06F 9/50* (2006.01)
*G06F 17/30* (2006.01)

(52) U.S. Cl.
CPC .............. *G06F 9/5038* (2013.01); *G06F 9/50* (2013.01); *G06F 2209/506* (2013.01); *G06F 17/30477* (2013.01)
USPC ........................................................ 718/104

(58) Field of Classification Search
None
See application file for complete search history.

(56) References Cited

U.S. PATENT DOCUMENTS

2007/0294671 A1* 12/2007 Demetriou et al. ........... 717/124

OTHER PUBLICATIONS

"Fairness Overview", adaptivecomputing.com/resources/docs/maui/6.1fairnessoverview.php, Adaptive Computing—Maui Scheduler Manual.
"Dominant Resource Fairness: Fair Allocation of Multiple Resource Types", Ali Ghodsi, Matei Zaharia, Benjamin Hindman, Andy Konwinski, Scott Shenker, and Ion Stoica, *University of California*, Berkeley, NSDI 2011.
"Bubble-Up: Increasing Utilization in Modern Warehouse Scale Computers via Sensible Co-locations", Jason Mars, Lingjia Tang, Robert Hundt, Kevin Skadron, Mary Lou Soffa, *Proceedings of the 44th Annual IEEE/ACM International Symposium on Microarchitecture (MICRO) 2011.*
"Contention Aware Execution: Online Contention Detection and Response", Jason Mars, Neil Vachharajani, Robert Hundt, Mary Lou Soffa *Proceedings of the ACM/IEEE International Symposium on Code Generation and Optimization (CGO) 2010.*
"Supporting GPU Sharing in Cloud Environments with a Transparent Runtime Consolidation Framework", V. T. Ravi, M. Becchi, G. Agrawal, and S. Chakradhar, *Proceedings of the International Symposium on High Performance Distributed Computing*, pp. 217-228, 2011.

(Continued)

*Primary Examiner* — Camquy Truong
(74) *Attorney, Agent, or Firm* — Joseph Kolodka

(57) ABSTRACT

Systems and methods for managing a processor and one or more co-processors for a database application whose queries have been processed into an intermediate form (IR) containing kernels of the database application that have been fused and split; dynamically scheduling such kernels on CUDA streams and further dynamically dispatching kernels to GPU devices by estimating execution time in order to achieve high performance.

20 Claims, 13 Drawing Sheets

(56) References Cited

OTHER PUBLICATIONS

"The Impact of Memory Subsystem Resource Sharing on Datacenter Applications", L. Tang, J. Mars, N. Vachharajani, R. Hundt, and M. L. Soffa, *Proceedings of the Annual Symposium on Computer Architecture*, pp. 283-294, Jun. 2011.

"Improved Utilization and Responsiveness with Gang Scheduling", D. G. Feitelson and M. A. Jette, D. Feitelson and L. Rudolph, editors, *Job Scheduling Strategies for Parallel Processing, Lecture Notes in Computer Science*, pp. 238-261. Springer Berlin/Heidelberg, 1997.

"Scheduling Techniques for Concurrent Systems", J. Ousterhout, *Proceedings of the International Conference on Distributed Computing Systems*, pp. 22-30, Oct. 1982.

"Paired Gang Scheduling", Y. Wiseman and D. G. Feitelson, *IEEE Transactions on Parallel and Distributed Systems*, 14(6):581-592, Jun. 2003.

\* cited by examiner

| |
|---|
| 310. For all operators in the IR, determine if the input data is too large to fit in the GPU memory. If so, mark the operator as a "CPU Candidate". Mark all other operators as "GPU Candidates". |
| 320. For every GPU Candidate, fuse with a neighbor that shares the most input data. If there is an estimated benefit from the fusing, keep the transformation. Continue the process iteratively until there are no beneficial fusion transformations. |
| 330. For every fused GPU Candidate, split the input vectors into two equal portions. If there is an estimated benefit from this splitting (using CUDA streams), keep the transformation. Continue the process iteratively until there are no beneficial splitting transformations. |

FIG. 1C

1. Update list of READY operators

2. Put oldest READY operator in TOSCHEDULE list. Allocate an available stream pool to it.

3. Until GPU cores or memory are full, keep adding READY operators to TOSCHEDULE list, preferring operators that occupy least GPU resources. Allocate an available stream pool to each operator in TOSCHEDULE list.

4. Issue first GPU kernel from each of the READY operators

5. When a kernel completes, issue its successor kernel within the stream. Continue issuing kernels based on completion of their predecessors in their streams. Alternatively, if performance history is available, compute optimal schedule before dispatching kernels 6. Update performance history table as each kernel completes 7. When all kernels done, return to 1.

FIG. 10

OPTIMIZING DATA WAREHOUSING APPLICATIONS FOR GPUS USING DYNAMIC STREAM SCHEDULING AND DISPATCH OF FUSED AND SPLIT KERNELS

This application claims priority to provisional applications with Ser. Nos. 61/545,829 filed Oct. 11, 2011 and 61/586,309 filed Jan. 13, 2012, the content of which are incorporated by reference.

BACKGROUND

This application relates to co-processors for data warehousing.

Data warehousing applications are well known for their two features: huge fine-grained data parallelism and massive amounts of processing data. The first feature makes it possible to design an efficient and effective implementation of database queries on graphic processing units (GPUs). However, the second feature causes the traditional memory hierarchies, specifically the limited DRAM of the host environment to which the GPUs are connected, to be a critical bottleneck and the problem is further amplified by the PCIe bus interconnection between the host and GPUs.

Data warehousing applications require the processing of relational queries and computations over massive amounts of data. The use of programmable graphic processing units (GPUs) has emerged as a potential vehicle for high throughput implementations of such applications with the potential for an order of magnitude or more performance improvement over traditional CPU-based implementations. This expectation is motivated by the fact that GPUs have demonstrated significant performance improvements for data intensive applications such as molecular dynamics, physical simulations in science, options pricing in finance, and ray tracing in graphics. It is also reflected in the emergence of accelerated cloud infrastructures such as Amazon's EC-2 with GPU instances.

However, given the fundamental differences between data warehousing applications and compute intensive HPC applications, until recently, it was not clear if GPUs were a good match for this application domain. GPUs are many-core PCI-based co-processors that have been used to accelerate several scientific applications such as computational fluid dynamics, weather modeling and molecular dynamics. However only recently have they been considered for accelerating database processing. While database applications have considerable parallelism within, they have been considered as bad candidates for GPUs because they are often I/O bound, and GPUs have small memories with no disk access. This means large amounts of data will have to be repeatedly transferred to the GPU across the PCI bus. These transfers have been observed to be as high as 15-90% of the total execution time, possibly negating any speedups obtained due to the GPU itself.

One of the factors that have made the use of GPUs challenging for data warehousing applications is the absence of efficient GPU implementations of basic database primitives, e.g., relational algebra. Another factor that is more fundamental to current GPU capabilities is the set of limitations imposed by the GPU memory hierarchy, as shown in FIG. 1: i) compared to CPUs, GPUs have a limited amount of memory directly attached to them, which makes in-memory databases impractical without an intelligent data management scheme, and ii) the PCIe bandwidth of commodity platforms could, for databases, cause a high overhead for data movement to and from the GPU. Prior efforts on accelerating relational algebra operators with GPUs have demonstrated 2-27× speedup when considering only the computation time within the GPU. However, data warehousing applications are typically I/O bound.

To address the limited memory and PCI bandwidth issues, a recent approach has proposed the techniques of kernel fusion and kernel fission, the latter also referred to as kernel splitting. These techniques, explained in detail later, are relevant to the current invention. Given fused and split kernels, the current invention proposes a method and system to manage them by introducing a Stream Pool, and a corresponding stream scheduling method. The proposed methods directly aim to improve performance of fused and split RA kernels on GPUs.

FIG. 1A shows an illustrative example of kernel fusion. The graph on the left side depicts two vectors A1 and A2 that are summed by "Kernel A". Then vector A3 is subtracted from the result of the A1+A2 summation using "Kernel B". The right side of the FIG. shows the two kernels Kernel A and Kernel B merged into a single fused kernel.

In one embodiment of the recently proposed kernel fusion and fission, relational algebra (RA) operators are used to express the high level semantics of an application in terms of a series of bulk operations on relations. These are the building blocks of modern relational database systems. In addition to these operators, data warehousing applications perform arithmetic computations ranging from simple operators such as aggregation to more complex functions such as statistical operators used for example in forecasting or retail analytics. Finally, operators such as sort and unique are required to maintain certain ordering relations amongst data elements or relations. Each of these operators may find optimized implementations as one or more CUDA kernels. All of these kernels are potential candidates for fusion/fission.

FIG. 1B shows one exemplary system for fusing kernels. Database queries are processed by a compiler into an intermediate form (IR). The intermediate form contains the operators (kernels) of the database application. A compiler framework 202 and queries 204 and IR 206 operate in a static domain. A fusion engine 210 operates in a dynamic domain (dynamic kernel fusion). In this context, kernel fusion merges two or more database operators (kernels) into a larger one that is functionally equivalent to the original ones. Kernel fusion reduces data transfer to the coprocessor, and coupled with other optimizations such as fused-kernel splitting, data transfer can be overlapped with coprocessor computation and thus hidden. The fusion engine 210 has three major blocks or modules:

1. Dependence & Cost Analysis: The kernels in the IR are analyzed for data dependence and a decision regarding (i) which kernels to execute on the CPU (ii) which kernels to fuse and execute on the GPU and (iii) which fused kernels to split and execute using CUDA streams that overlap data transfer with GPU computation. The decisions are based on a cost analysis that takes into account the estimated data transfer to/from the GPU and other improvements due to fusion.

2. Code Generation: Once the fusion decision is made, code for the fused kernels is automatically generated at runtime.

3. Dispatch: After code generation, the kernels are dispatched to CPU 280 or GPU 290.

The system is focused on optimization of a data warehousing applications to address the second challenge above. Warehousing applications are typically comprised of a number of relational algebra and arithmetic kernels that interact through producer-consumer relationships over large data sets.

FIG. 1C shows an exemplary process for fusing kernels. First, in 310, for all operators in the IR, the process determines if the input data is too large to fit in the GPU memory. If so, the process marks the operator as a "CPU Candidate". The process also marks all other operators as "GPU Candidates". Next, in 320, every GPU Candidate is fused with a neighbor that shares the most input data. If there is an estimated benefit from the fusing, keep the transformation. This is repeated iteratively until there are no more beneficial fusion transformations. In 330, for every fused GPU Candidate, the process splits the input vectors into two equal portions. If there is an estimated benefit from this splitting (using CUDA streams), the transformation is kept. The system continues the process iteratively until there are no more beneficial splitting transformations.

Using a decision support benchmark suite that is widely used today (TPC-H), a list of 22 queries of a high degree of complexity is determined. The queries analyze relations between customers, orders, suppliers and products using complex data types and multiple operators on large volumes of randomly generated data sets. Across the 22 queries of TPC-H, FIG. 2 lists the frequently used patterns of operators that might be the good candidates for our fusion and fission optimization. In the figure, (a) is a sequence of back-to-back SELECTs that filter for instance a date range, (b) is a sequence of JOINs to create a large TA consisting of multiple fields, (c) represents the case when different SELECTs need to filter the same input data, (d) and (e) are examples that perform SELECT or to do math calculations with two fields generated by a JOIN, (f) needs to JOIN two small selected tables, (g) performs AGGREGATION on selected data and (h) shows the pattern that could be used for calculating, for instance, the total discounted price of a set of items using (1−discount)×price. The last PROJECT in (h) discards the source of calculation and only keeps the result. The above patterns can be further combined to form a larger pattern that can be fused. For example, (e) can generate the input of (h).

FIG. 3 shows the four stages to perform one SELECT on a CUDA-enabled GPU, available from NVidia Corporation. The first stage partitions the input data into smaller chunks, each of which is handled by one Cooperative Thread Array (CTA) that be executed in any order. In the second stage, the threads in each CTA filter elements in parallel. Next, the unmatched elements are discarded and the rest buffered into an array. Finally, in the fourth stage, the scattered, matched results are gathered together into the GPU memory. A global synchronization is needed before the gather step so that the filtered results can determine their correct position. The first three stages are implemented in one CUDA kernel and the final gather in a second CUDA kernel. Data indicates that the GPU computational throughput rates are much higher than what the PCIe bandwidth permits. A short conclusion of the above motivational example is that although GPU can provide tremendous raw computation power for RA operators, the PCIe bandwidth prevents database applications from utilizing. Kernel fusion and kernel fission try to solve this problem by hiding the overhead of data movement between CPU and GPU as well as within the GPU device to better utilize the GPU computation power. The benefits of these two techniques should be applicable to different implementations of RA operators.

Kernel fusion reduces the data flow between kernels by merging them into a new larger kernel. FIG. 4 shows an example of kernel fusion with two kernels, one addition and one subtraction, and three inputs before fusion. These two kernels have a dependency between them since the result of addition is one of the inputs of the subtraction. After fusion, one single functionally equivalent new kernel (FIG. 4b), which performs both addition and subtraction, will replace the original two kernels. The new kernel directly reads in three inputs and outputs the same result at the end.

Kernel Fusion has six benefits as listed below and shown in FIG. 6. The first four stem from creating a smaller data footprint by fusing, while the other two relate to increasing the compiler's optimization scope.

A) Smaller Data Footprint: Fusing reduces the data footprint of the kernel, which in turn results in the following four benefits:

1. Less PCIe Traffic: Since kernel fusion produces a single fused kernel, there is no intermediate data (FIG. 6(a)). In the absence of fusion, if the intermediate data is larger than the relatively small GPU memory, or if it precludes storing other required data, it will need to be transferred back to the CPU incurring serious performance overheads. For example, if kernels generating A3 in FIG. 6(a) need most of the GPU memory, the result of the addition has to be transferred back to the CPU first and transferred back to the GPU before the subtraction. Fusion makes this extra round-trip and costly PCIe overheads unnecessary.

2. Larger Input Data: Since the intermediate data does not need to explicitly stored in GPU memory, the saved space can be used to store more input data loaded from the CPU (FIG. 6(b)). This is especially important when the working set size is large. Therefore kernel fusion enables larger working sets.

3. Less GPU Memory Access: Kernel fusion also reduces data movement between the GPU device and its off-chip main memory (FIG. 6(c)). Fused kernel stores the intermediate data in GPU registers (shared memory or cache), which can be accessed much faster than the off-chip GPU memory. Not fused kernels have a larger cache footprint necessitating more off-chip memory access.

4. Temporal Data Locality: Like loop fusion, kernel fusion reduces array traversal overhead and brings data locality benefits. The fused kernel only needs to access every array element once while unfused kernels need to do it multiple times (FIG. 6(d)). Moreover, fused kernels use the cache better if the data access pattern is linearly strided, but not fused kernels may have to access off-chip GPU memory if the revisited data is flushed.

B) Larger Optimization Scope

Fusing also creates a larger body of code that the compiler could optimize. This provides two benefits:

1. Common Stages Elimination: If two kernels are fused, the common stages are redundant and can be saved. For example, the original two kernels in FIG. 6(e) both have stages S1 and S2 which need to run only once after fusion. As to SELECT operator, fused kernel only need one partition, buffer and gather stage.

2. Better Compiler Performance: Fused kernels contain more instructions than not fused ones, which is good for almost all classic compiler optimizations such as instruction scheduling, register allocations and constant propagation. These optimizations can speed up the overall performance (FIG. 6(f)). Table 1 compares the speedup of using O3 flag to optimize not fused and fused kernels. Before fusing, the two filter operations are performed separately in their own kernels rather than in the same kernel after fusion is applied. The third and fourth columns show the number of corresponding PTX instruction when using different optimization flags. This shows using compiler optimizations fused kernel provides a 40% speedup (5 instructions in each kernel down to 3 instructions) while optimizing a fused kernel achieves a higher 70% speedup.

Generally, fusing more kernels is good for all the benefits mentioned above. A simple example is that fusing three SELECTs still only need one gather stage. Thus, more RA operators are fused, more speedup can be achieved.

In data warehousing, kernel fusion can also be applied across queries since RA operators from different queries can be fused together which brings more optimization opportunity for a large database server.

In generating the "middle function" like the filter of the SELECT, one domain specific solution executes the functional stage of the original kernel one by one in the sequence not violating the original dependency. After executing the stage of one kernel, the content and the position of the result should be stored in a temporary register and later used by its consumer kernels. Fusion can be performed in the source code level with the help of tool such as ROSE or in the AST level by using Ocelot.

To find beneficial kernel fusions, the system runs two compiler analyses: one to discover feasible kernels to fuse, and the second to select the best among the feasible kernels. The first analysis is essentially a data dependence analysis that discovers candidate kernels to fuse. Two kinds of dependence may exist: i) the elements of the consumer kernel only depends on the completion of one element of the generator kernel (e.g. FIG. 2(a)), ii) the elements of the consumer kernel depends on the completion of the entire generator kernel (e.g. FIG. 2(b)). Different dependence requires different treatment: i) is easier since dependence of two arrays can be thought as the dependence of two scalars. As to ii), domain specific knowledge has to be used. For example, JOIN-JOIN can be fused with careful design, but JOIN-SORT cannot be fused since SORT needs to wait for the end of JOIN. The second compiler analysis is a cost analysis that predicts the performance when candidates are fused and then decides which kernels should be combined. If fusion is applied dynamically, some heuristics should be used to make quick decisions.

In general, fusing more kernels usually enhance performance improvements. However, "over-fusing" may hurt performance or even make it impossible to run, for example, if the whole application is fused into one kernel even if its data size fits the GPU memory. The main reason is that kernel fusion will bring more register (shared memory) pressure since each thread has to store more intermediate value within the GPU. Thus, the fused kernel has to leverage less concurrency due to less occupancy or cannot afford so much storage space at all. Moreover, kernel fusion is a general cross-kernel optimization that can also be applied to CPU programs since it still can improve the computation performance.

SUMMARY

Systems and methods are disclosed for managing a processor and one or more co-processors for a database application whose queries have been processed into an intermediate form (IR) containing operators of the database application that have been fused and split and consisting of multiple co-processor kernels. The system dynamically schedules the fused and split operators to co-processor streams; and dynamically dispatches the co-processor kernels of the fused and split operators to selected streams.

Fused and split kernels enhance performance of database primitives and operators on GPUs. The present invention discloses methods and systems for managing such operators on GPUs. Specifically it discloses methods for scheduling fused and split operators onto GPU streams, and methods for dispatching GPU kernels within such fused and split operators in such a way that performance is optimized.

GPU streams provide the benefit of overlapping co-processor computation with communication. However, without careful scheduling of operators onto such streams, optimal performance cannot be achieved. Optimal scheduling depends on the execution time of the specific operators and kernels involved. Different fused and split database operators can incur different execution times depending on data size, and other factors. This invention proposes methods to estimate execution time and perform scheduling based on the estimates.

The system disclosed in the invention includes a Stream Pool that consists of the above scheduler, as well as a framework to alleviate stream management. Currently programmers have to explicitly manage GPU streams by creating, destroying and scheduling operators to them. The proposed Stream Pool eases the management by maintaining a set of available streams and allocating them to operators on demand.

The invention also discloses methods to remove redundant data transfers between the host and coprocessor for database applications.

BRIEF DESCRIPTION OF THE FIGURES

FIG. 1C shows one exemplary process for fusing kernels.
FIG. 10 shows an exemplary process to operate the system of FIG. 7.

DESCRIPTION

Figure 1A:
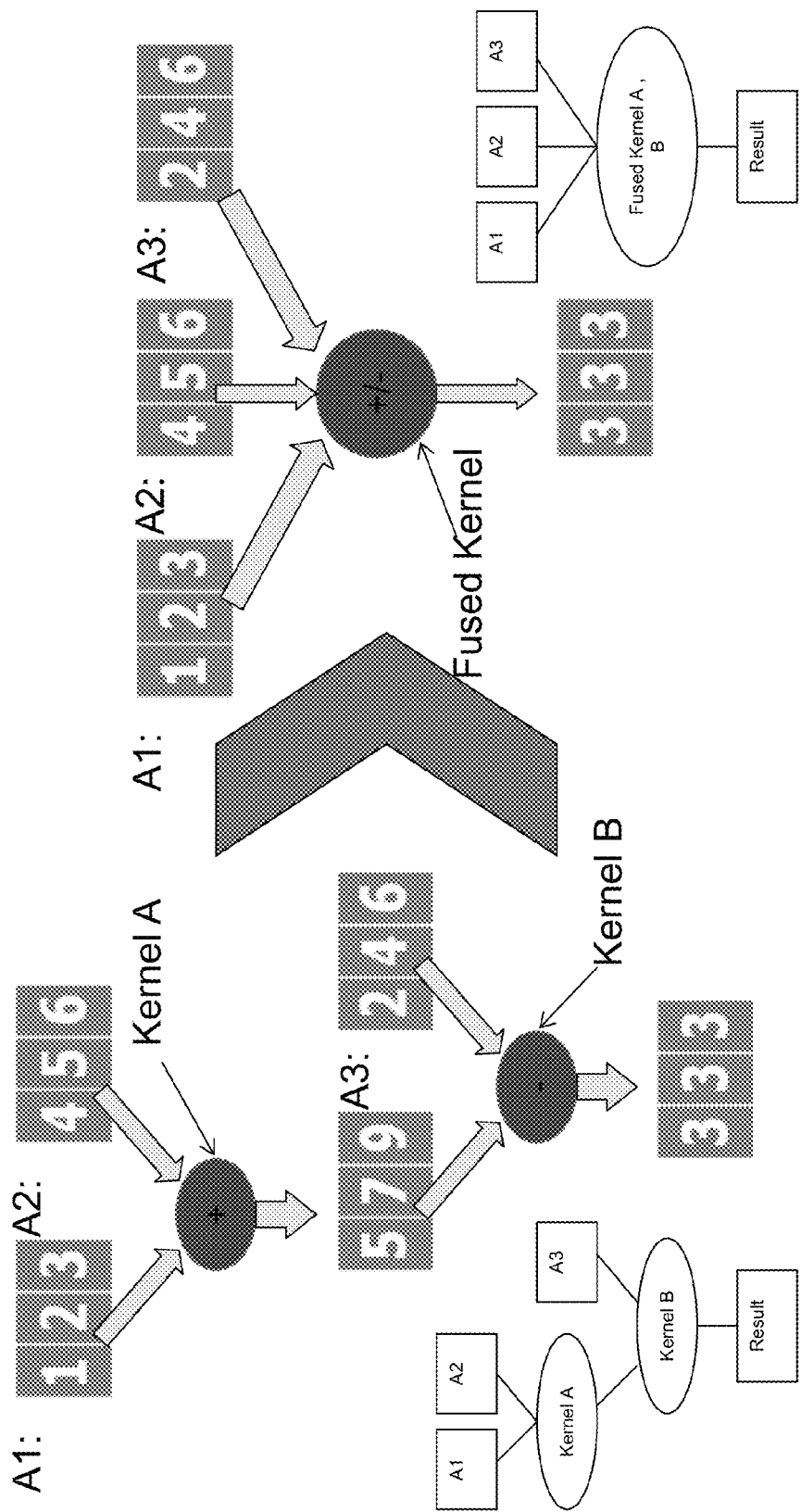
FIG. 1A shows an illustrative example of kernel fusion.
Figure 1B:
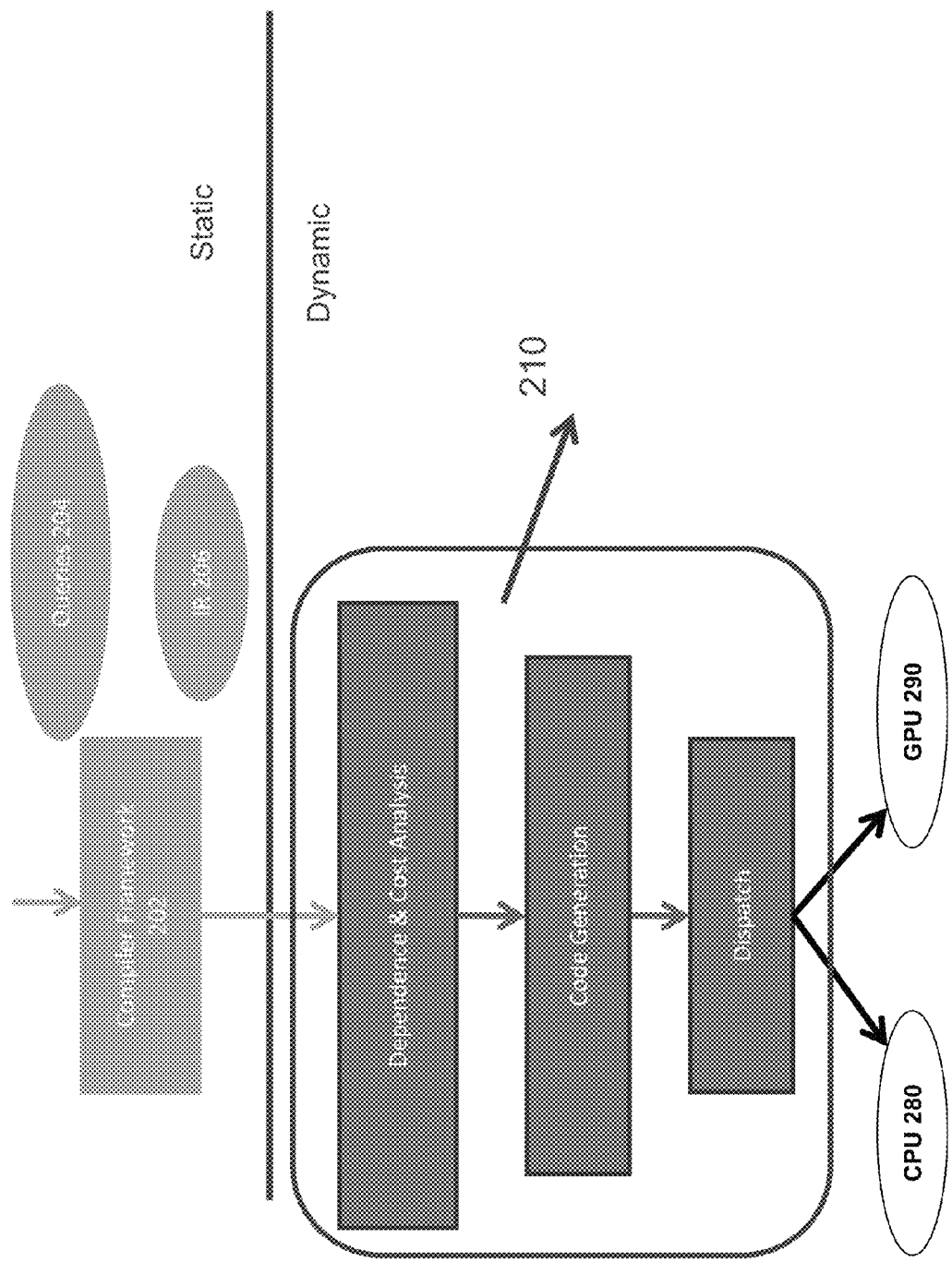
FIG. 1B shows one exemplary system for fusing kernels.
Figure 2:
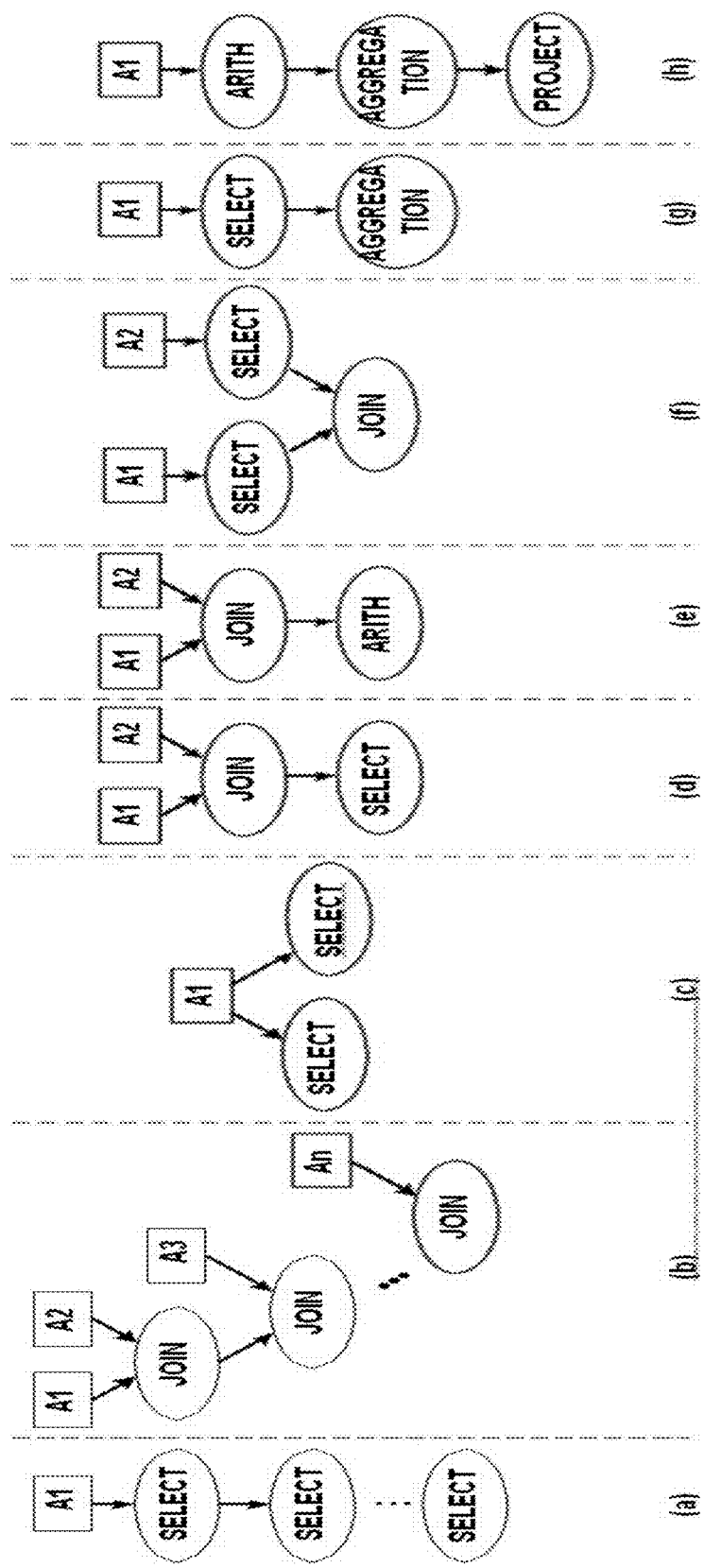
FIG. 2 shows an exemplary set of common operator combinations to fuse.
Figure 3:
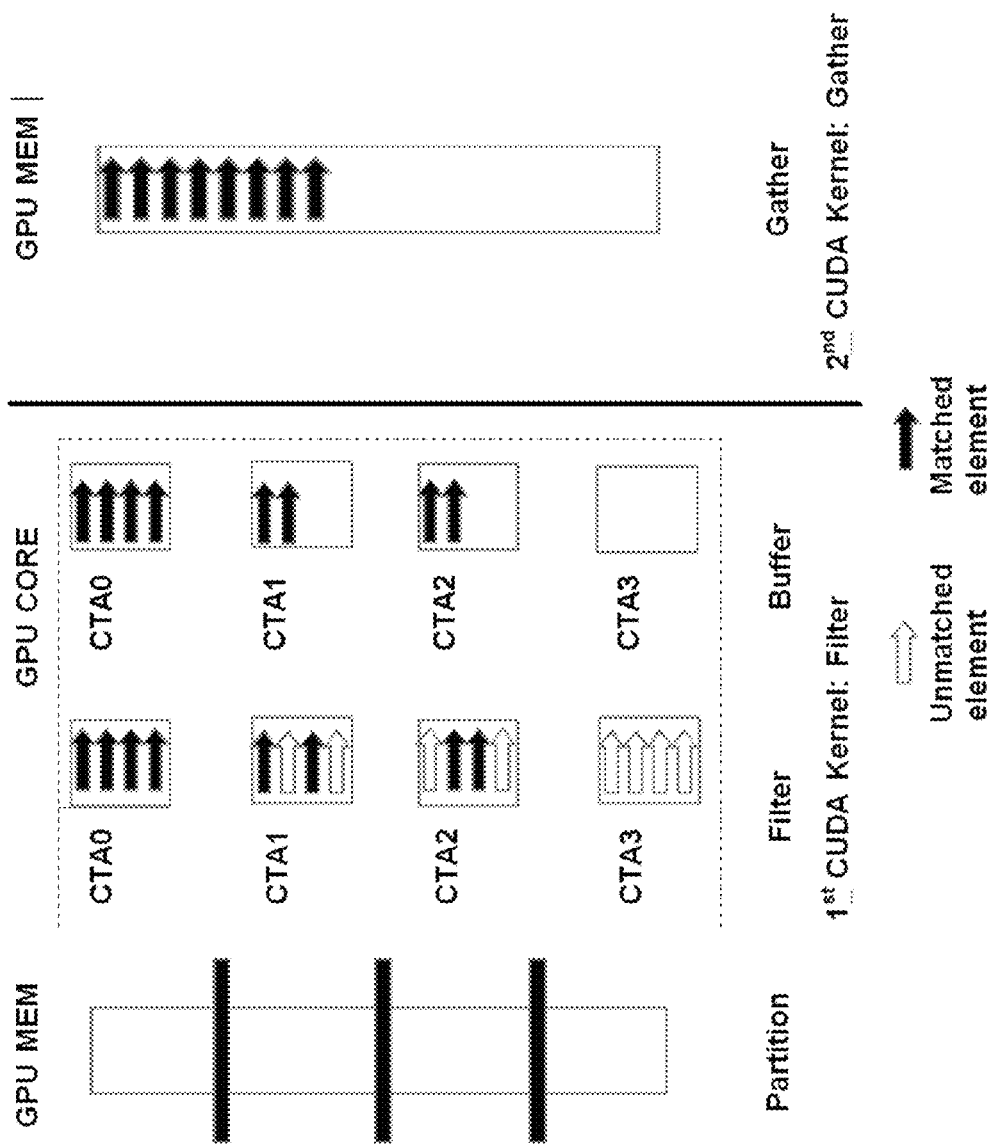
FIG. 3 shows exemplary four stages to perform one SELECT on a CUDA-enabled GPU.
Figure 4:
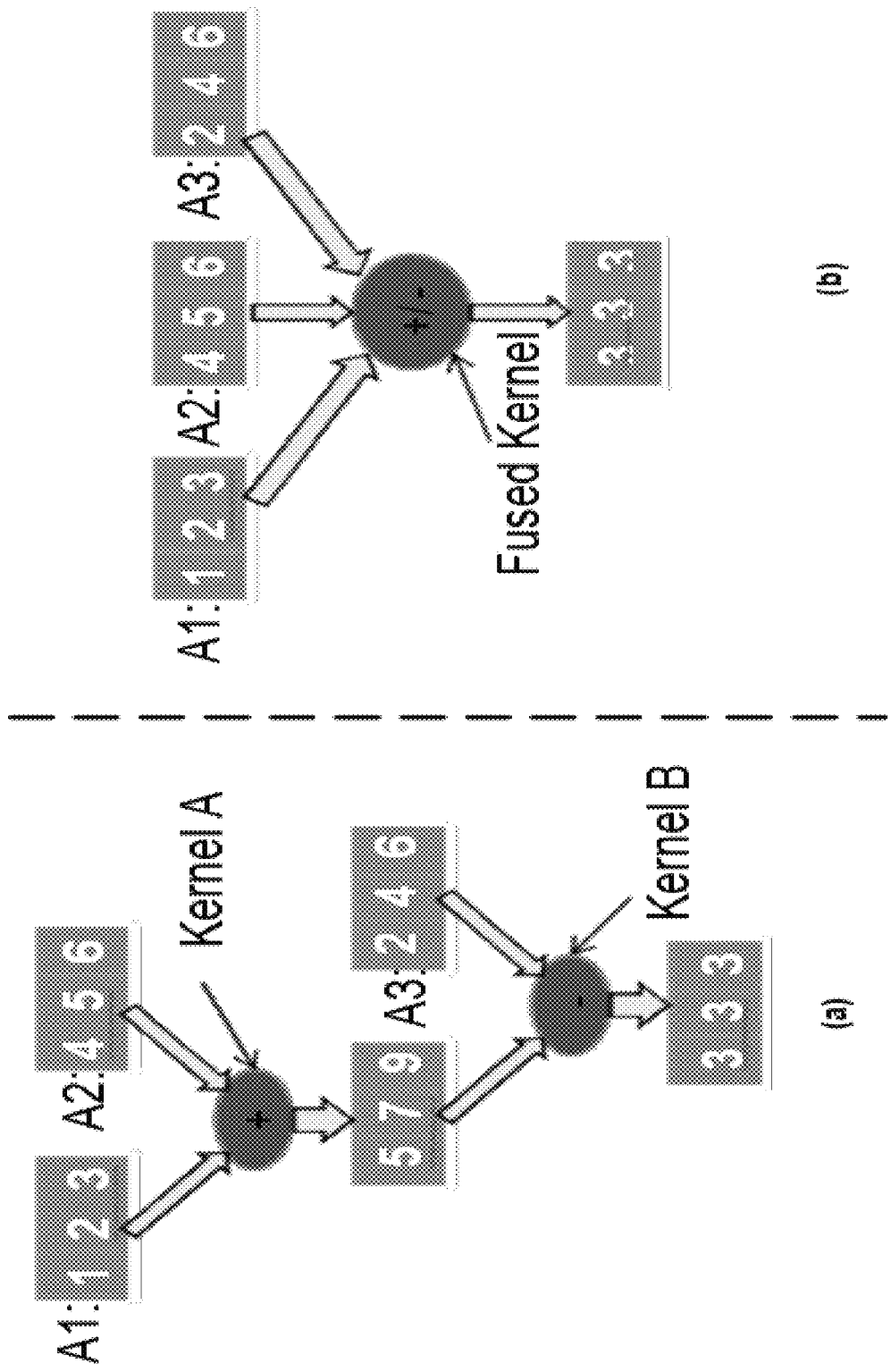
FIG. 4 shows an example of kernel fusion.

While kernel fusion reduces the data footprint and enhances the scope of compiler optimizations, kernel fission simply breaks up a kernel and hides the PCIe transfer time by overlapping one portion's execution with another portion's data transfer. This optimization uses CUDA streams, a feature provided by Nvidia CUDA. GPU commands (e.g. PCI-e transfer, CUDA kernel) in the same CUDA Stream run in order, but those in different CUDA Streams can run concurrently. We built a software runtime manager called the Stream Pool to aid kernel fusion and fission.

Currently programmers bear the burden of CUDA stream management, including creating and destroying the stream, arranging synchronization points between streams by calling the low level CUDA APIs (since the GPU does not have an OS yet), and so on. Besides improving performance by reducing PCIe overhead, a Stream Pool is designed to abstract away the details of CUDA stream management and enhance programmer productivity.

The Stream Pool is implemented as a library and provides some straightforward high level APIs listed in Table 2. To use it, programmer links to its library during compilation and use its API to assign commands to streams and set synchronization points without knowledge of which CUDA Stream is actually used.

TABLE 2

The impact of kernel fusion on compiler optimization

| Statement | | Inst Num (O0) | Inst Num (O3) |
|---|---|---|---|
| not fused | if (d < THRESHOLD1) if (d < THRESHOLD2) | 5 × 2 | 3 × 2 |
| fused | if (d < THREASHOLD1 && d < THREADSHOLD2) | 10 | 3 |

TABLE 2

APIs provided by Stream Pool

| API | Comment |
|---|---|
| getAvailableStream( ) | get an available stream from the Stream Pool |
| setStreamCommand( ) | assign a command to a specific stream |
| startStreams( ) | start the execution of the Stream Pool |
| startAll( ) | wait for the end of the execution of the Stream Pool |
| selectWait( ) | assign point to point sychronize between two specific streams |
| terminate( ) | end the execution of Stream Pool immediately |

The implementation of Stream Pool is as follows: during pool construction time, it generates several CUDA Streams each of which is tagged with attributes such as availability, lists of commands waiting to execute, and so on. Then the provided APIs will check or set these attributes to communicate with the CUDA Stream that is actually used.

A straightforward use of CUDA Stream is to assign independent kernels to different streams. However, the CUDA Stream has a limitation that kernels can run concurrently only if each of them occupies a small amount of device resources which means each kernel has to use fewer CTAs and fewer threads as well. The SELECT operator can be used to illustrate how much this method can improve the performance. The line no stream (old) is the same as the GPU 50%. The line no stream (new) uses less threads and CTAs, with everything else being the same as the no stream (old). The performance of (new) is much worse than (old). The line stream uses CUDA Streams to concurrently run two independent SELECTs using the same design as (new). The performance of (stream) is better than (new) since two SELECTs can run concurrently. However, stream is much worse than (old) for more than 8 million elements. It shows that concurrency is beneficial for small numbers of elements because of lesser data parallelism. For large numbers of elements, concurrent stream execution is not advantageous to sequential execution.

Since database applications usually have very large data sets, simply assigning kernels to streams is not suitable from the above analysis. Another method to use CUDA Stream is to pipeline the execution of a kernel to parallelize the GPU computation (in some CUDA Streams) with the PCIe data transfer (in some other CUDA Streams). In practice, this is equivalent to partitioning the CTA of a kernel and letting the data transfer of some CTAs and the execution of the other CTAs work in parallel. Thus, the PCIe transfer is hidden by the computation. This method, which is referred as kernel fission, is especially useful when the element number is large because it can hide more PCIe transfer time. The GPU device used in one embodiment, NVidia Tesla C2070, can overlap two PCIe transfers with a computation kernel which means the following three events can happen at the same time: one stream is downloading data to GPU, the other stream is computing and the third stream is uploading result to the CPU. For such a device, at least three streams are needed to fully utilize its concurrency capacity.

For database applications, a SELECT operation can be used to show how kernel fission can be applied to RA kernels. At first (cycle 0), CTA0 is transferring its result to the CPU, CTA1 is performing the computation, and CTA3 is loading input from the CPU. All three CTAs are running concurrently. After they finish their current tasks and next cycle begins when CTA0 loads new inputs, CTA1 transfers its new result to the CPU, and CTA2 starts computing on its newly received data. In this way, the PCI-e transfer time is overlapped by the computation. In theory, the execution time of using kernel fission to run a kernel is equal to the maximum time of CPU→GPU, GPU computing and GPU→CPU. For the example of SELECT, the maximum number is the input transfer time because the result of SELECT is smaller than the input, and the operator itself is computationally light. Thus, the performance of running one SELECT with kernel fusion is relatively insensitive to the filter fraction (expected number of input elements selected) of the operator. The drawback of kernel fission is that it has to use the pinned memory to transfer data which may hurt the CPU performance by reducing the available memory of CPU to perform other critical system tasks.

Kernel fusion and fission are orthogonal and can be used together when more than one RA operator is involved since the partitioned CTA can run the fused kernel. Using two back-to-back SELECTs, the difference between using both fission and fusion and fission only is that the computation part is running the fused kernel. In contrast to using kernel fusion only, only two CTAs perform the calculation while the other four CTAs are used to transfer data. Another difference is that CPU has to gather the data at the end since the results are transferred to CPU at different time.

Figure 7:
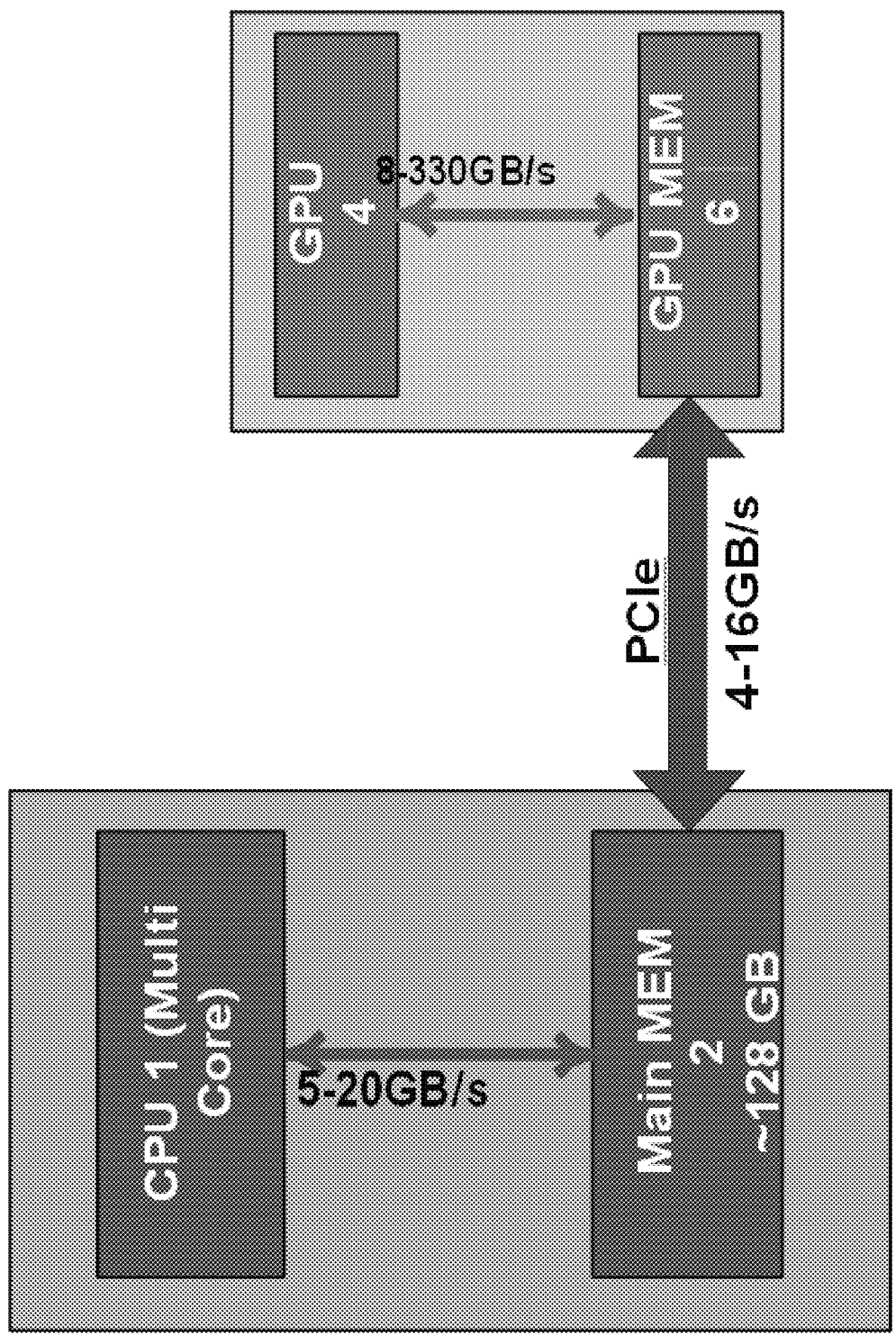
FIG. 7 shows an exemplary CPU-GPU system.

FIG. 7 shows an exemplary computer system with CPU 1 and GPU 4. The CPU 1 communicates with its main memory 2, while GPU 4 communicates with its own memory 6. Data is transferred between the two memories 2 and 6 through a bus such as the PCIe bus. The system is used in data warehousing applications which are well known for their two features: huge fine-grained data parallelism and massive amounts of processing data. The first feature makes it possible to design an efficient and effective implementation of database queries on GPUs. However, the second feature causes the traditional memory hierarchies, specifically the limited DRAM of the host environment to which the GPUs are connected, to be a critical bottleneck and the problem is further amplified by the PCIe interconnection between the host and GPUs. To address this issue, the system runs kernel fusion to reuse processing data by merging several functional operators to shrink data footprint thus the data movement overhead and improve the GPU computation as well. Differently, kernel fission aims to pipeline the execution of the operators with the PCIe transfer. Dynamic kernel fusion and fused-kernel splitting result in faster operation of database applications in a coprocessor-based system.

Figure 5:
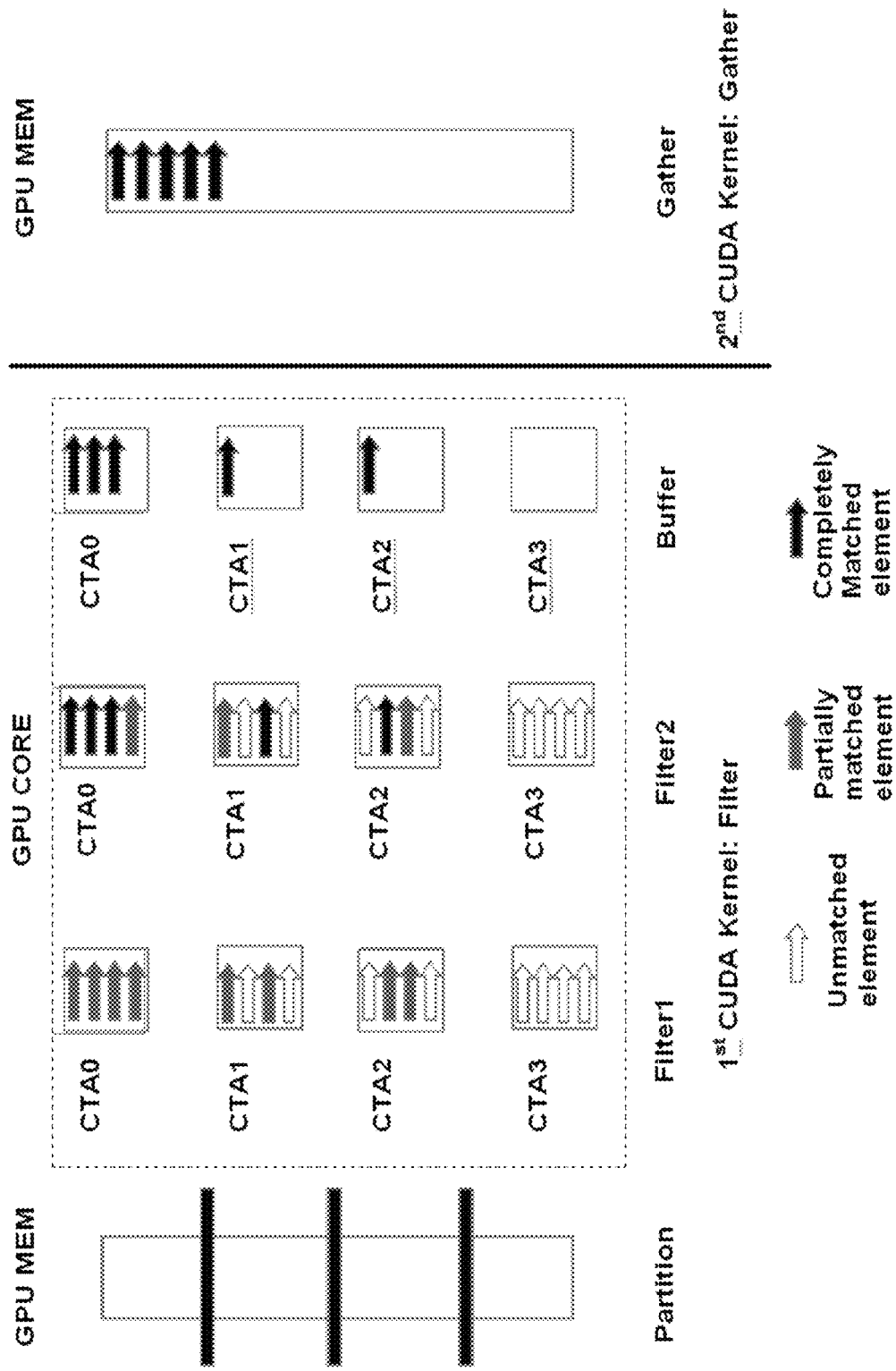
FIG. 5 shows an exemplary fusion of two back-to-back SELECT operations on the GPU.
Figure 6:
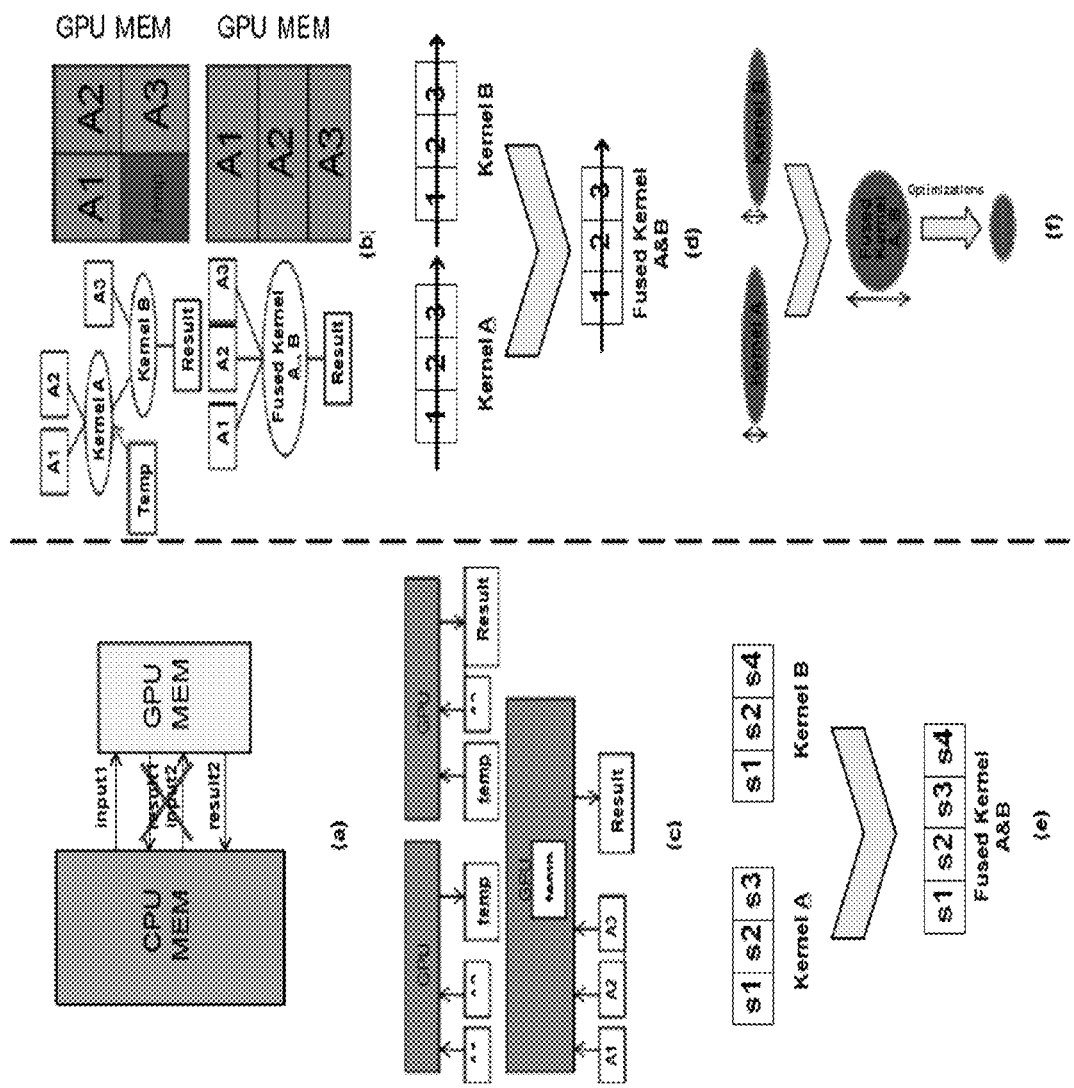
FIG. 6 shows exemplary benefits of kernel fusion.
Figure 8:
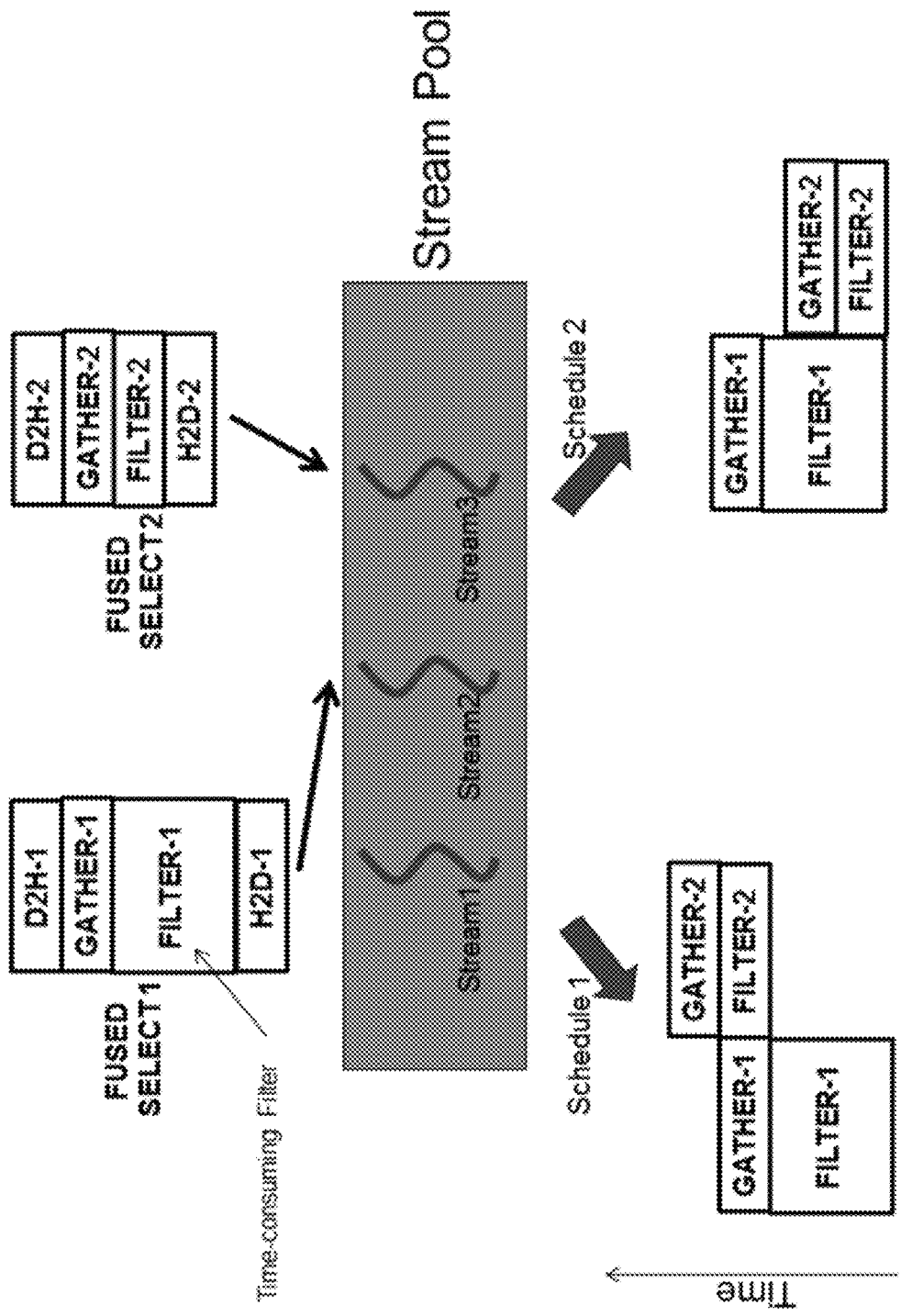
FIG. 8 shows one arrangement for assigning fused and split kernels to streams that can result in performance problems.

Assigning fused and split kernels to streams can result in performance problems as illustrated in FIG. 8. The figure shows two fused SELECT operators, with the FILTER and GATHER kernels (shown in FIG. 5). The two SELECT operators are asymmetric in that their FILTER kernels incur different execution times. Supposed the system maps SELECT 1 to Stream 2, and SELECT 2 to Stream 3 (both via the API call getAvailableStream( )). Under Schedule 1, further suppose the issue order is FILTER-1, GATHER-1, FILTER-2 and GATHER-2, as shown in the left-bottom part of the figure. The GPU device has a single COMPUTE queue, from which kernels are dispatched to be executed in FIFO order. Since FILTER-1 takes a longer time to execute, its successor in Stream 2, GATHER-1 is blocked. This further blocks FILTER-2 unnecessarily. However, if the issue order (shown in Schedule 2 on the right-bottom portion of the figure) is FILTER-1, FILTER-2, GATHER-2, GATHER-1, then FILTER-2 is not blocked, and the kernels can execute concurrently and finish faster.

Figure 9:
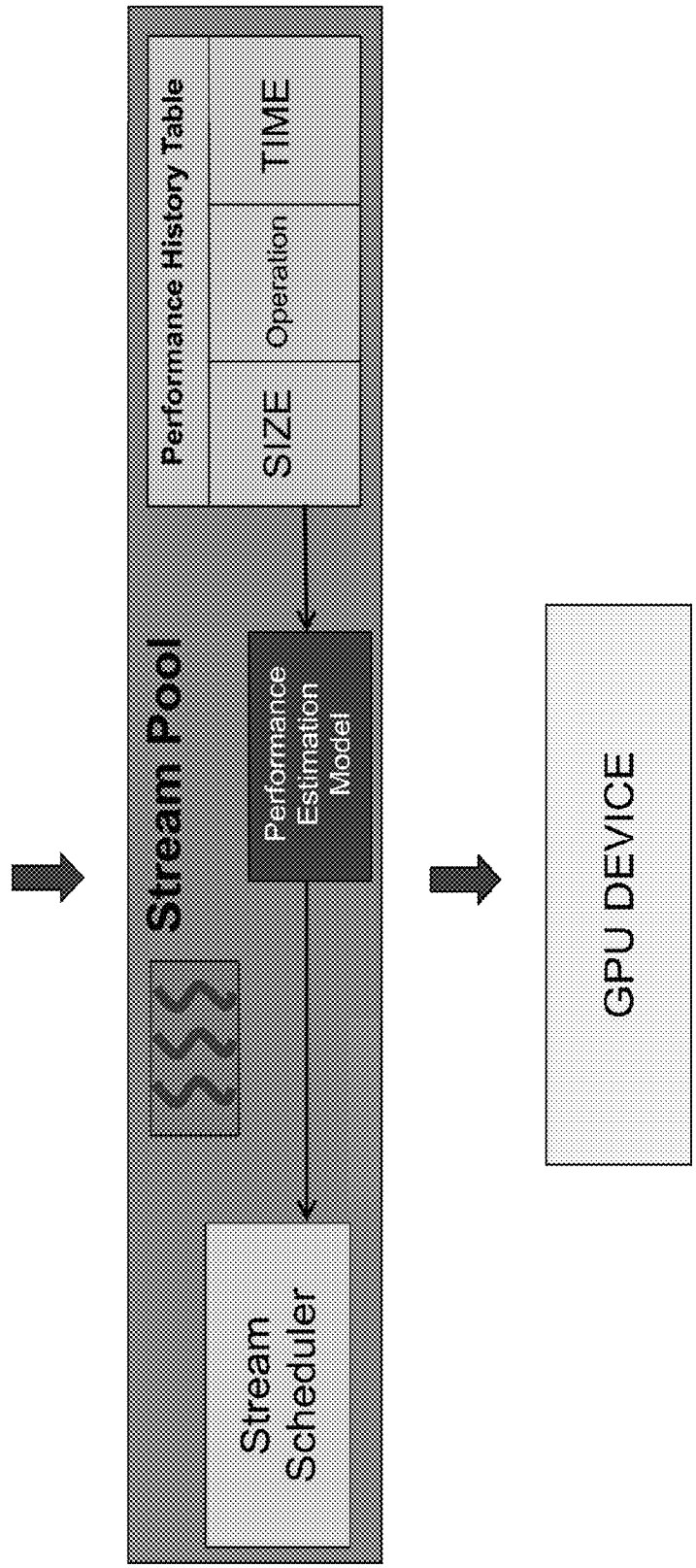
FIG. 9 shows an exemplary system that can schedule based on kernel completion times.

To address this issue, one embodiment includes a system that can schedule based on kernel completion times. The system is shown in FIG. 9. The Stream Pool is expanded to contain a Stream Scheduler, Performance History Table and Performance Estimation Model. FIG. 10 shows a method for scheduling fused and split kernels onto streams. The scheduler operates on a list of READY operators which are fused and split RA operators in the database query plan. Each READY operator is assumed to consist of multiple CUDA kernels that can be intercepted by the Stream Pool. The scheduler first selects the oldest READY operator and inserts it in a TOSCHEDULE list. An available stream from the pool is allocated to this operator. The scheduler then keeps adding READY operators to the TOSCHEDULE list as long as they can be accommodated concurrently on the GPU. One the TOSCHEDULE list is full, the schedule begins to issue individual kernels to the GPU. The goal is to issue the kernels in such a way that performance is maximized.

In the first method, it selects the first kernel from all READY operators, and issues it for execution. Then, in a greedy scheme, it issues the successor kernel of the first kernel that completes. In an alternate embodiment, it can use historical performance data and produce an optimal issue order for all the kernels in the ready operator list. As each kernel completes, the scheduler records its completion time in the performance history table.

FIG. 10 shows an exemplary process to operate the system of FIG. 7. The process performs the following:
1. Update list of READY operators
2. Put oldest READY operator in TOSCHEDULE list. Allocate an available stream pool to it.
3. Until GPU cores or memory are full, keep adding READY operators to TOSCHEDULE list, preferring operators that occupy least GPU resources. Allocate an available stream pool to each operator in TOSCHEDULE list.
4. Issue first GPU kernel from each of the READY operators
5. When a kernel completes, issue its successor kernel within the stream. Continue issuing kernels based on completion of their predecessors in their streams. Alternatively, if performance history is available, compute optimal schedule before dispatching kernels
6. Update performance history table as each kernel completes
7. When all kernels done, return to 1.

Figure 11:
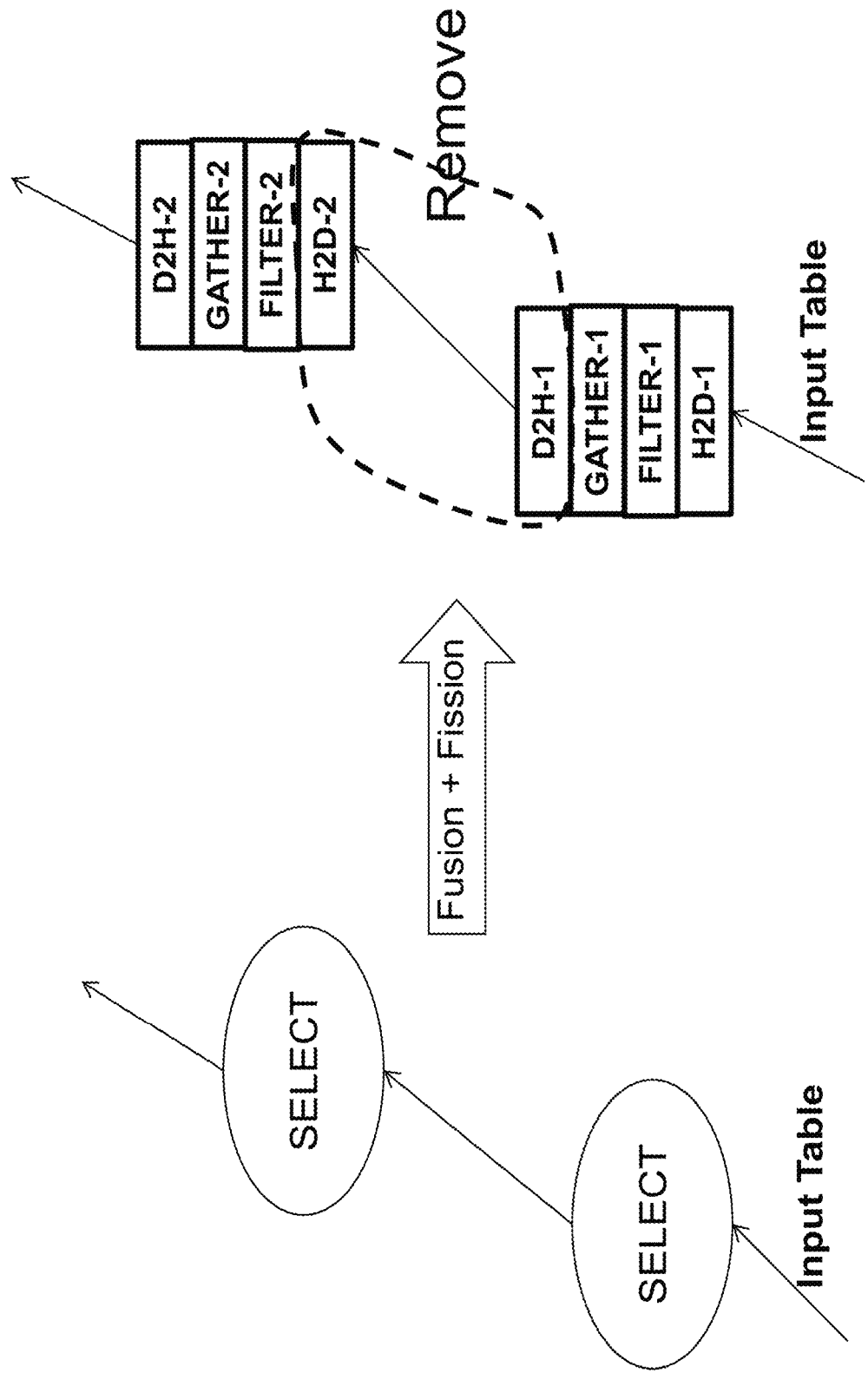
FIG. 11 shows exemplary back-to-back transfers of redundant data which can be eliminated.

An extension to improving performance is removing redundant data transfers. This may be achieved by means of the compiler or at runtime. The idea is that fused and split kernels contain two data transfers each—one H2D ("Host2Device") and the other D2H ("Device2Host"). In cases such as the one shown in FIG. 11, back-to-back transfers of the same data are redundant and may be eliminated. A compiler pass can achieve this. Another possibility is doing this at runtime by deferring the D2H transfer until the next operator.

What is claimed is:

1. A method for managing a processor and one or more co-processors for a database application whose queries have been processed into an intermediate form (IR) containing operators of the database application that have been fused and split and consisting of multiple co-processor kernels, comprising:
   dynamically scheduling the fused and split operators to co-processor streams; and
   dynamically dispatching the co-processor kernels of the fused and split operators to selected streams;
   applying a scheduler to a list of the fused and split operators with relational algebra (RA) in a database query plan, wherein RA operators are used to express the high level semantics of an application in terms of a series of bulk operations on relations and wherein each operator includes kernels that are intercepted and wherein the scheduler first selects the oldest operator and inserts the operator into a scheduling list;
   allocating an available co-processor stream from the pool to the operator and adding operators to the scheduling list until the scheduling list is full and thereafter issuing individual co-processor kernels to the co-processor stream.

2. The method of claim 1, comprising selecting one or more operators based on usage of co-processor resources.

3. The method of claim 1, comprising selecting one or more operators based on age.

4. The method of claim 1, comprising selecting the co-processor kernels based on estimated execution time.

5. The method of claim 1, comprising estimating execution time of database operators using data size and linearity.

6. The method of claim 1, comprising selecting the co-processor kernels based on actual completion time of corresponding predecessors in their streams.

7. The method of claim 1, comprising deferring issuance of kernels that transfer data from device to host.

8. The method of claim 1, comprising removing redundant data transfers by combining back-to-back device-to-host and host-to-device kernels.

9. The method of claim 1, comprising assigning commands to streams and setting synchronization points without advanced knowledge of a processor stream.

10. The method of claim 1, comprising executing an application program interface (API).

11. The method of claim 10, wherein the API includes one or more of the following: a module to get an available stream from a stream pool, a module to assign a command to a predetermined stream, a module to start execution of the stream pool, a module to wait until completion of stream pool execution, a module to assign point-to-point synchronization between a plurality of streams, a module to halt execution of the stream pool.

12. The system of claim 11 where the stream pool consists of a execution time estimation model.

13. The system of claim 12, where the execution time estimation model is based on a linear interpolation of pool size and execution time.

14. A system for managing a processor and one or more co-processors for a database application whose queries have been processed into an intermediate form (IR) containing operators of the database application that have been fused and split and consisting of multiple co-processor kernels, comprising:

means for dynamically scheduling the fused and split operators to co-processor streams; and means for dynamically dispatching the co-processor kernels of the fused and split operators to selected streams;

a scheduler to process a list of fused and split operators with relational algebra (RA) in a database query plan, wherein RA operators are used to express the high level semantics of an application in terms of a series of bulk operations on relations and wherein each operator includes kernels that are intercepted and wherein the scheduler first selects the oldest operator and inserts the operator into a scheduling list and wherein the scheduler allocates an available co-processor stream from the pool to the operator and adding operators to the scheduling list until the scheduling list is full and thereafter issuing individual co-processor kernels to the co-processor stream.

15. The system of claim 14 where the stream pool consists of a stream scheduler for scheduling operators and issuing co-processor kernels.

16. The system of claim 11 where the stream pool consists of a performance history table.

17. The system of claim 16, wherein the performance history table to map a table size and operator to actual execution time.

18. The system of claim 14, comprising executing an application program interface (API).

19. The system of claim 18, wherein the API includes one or more of the following: a module to get an available stream from a stream pool, a module to assign a command to a predetermined stream, a module to start execution of the stream pool, a module to wait until completion of stream pool execution, a module to assign point-to-point synchronization between a plurality of streams, a module to halt execution of the stream pool.

20. The system of claim 14, comprising means for selecting one or more operators based on usage of co-processor resources and means for selecting one or more operators based on age.

* * * * *